(12) United States Patent
Soehner et al.

(10) Patent No.: US 10,220,766 B2
(45) Date of Patent: Mar. 5, 2019

(54) METHOD FOR CAPTURING OBJECTS IN THE ENVIRONMENT OF A VEHICLE

(71) Applicant: Dr. Ing. h.c. F. Porsche Aktiengesellschaft, Stuttgart (DE)

(72) Inventors: Sebastian Soehner, Karlsruhe (DE); Christian Schneider, Tuebingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 17 days.

(21) Appl. No.: 15/675,842

(22) Filed: Aug. 14, 2017

(65) Prior Publication Data
US 2018/0056852 A1 Mar. 1, 2018

(30) Foreign Application Priority Data
Aug. 24, 2016 (DE) .................. 10 2016 115 705

(51) Int. Cl.
| | | |
|---|---|---|
| B60Q 1/00 | (2006.01) | |
| B60Q 1/14 | (2006.01) | |
| G06K 9/00 | (2006.01) | |
| G01S 17/48 | (2006.01) | |
| G01S 17/89 | (2006.01) | |
| G01S 17/93 | (2006.01) | |
| G01S 7/481 | (2006.01) | |

(52) U.S. Cl.
CPC ............ *B60Q 1/14* (2013.01); *B60Q 1/0023* (2013.01); *B60Q 1/1423* (2013.01); *G01S 7/4815* (2013.01); *G01S 17/48* (2013.01); *G01S 17/89* (2013.01); *G01S 17/936* (2013.01); *G06K 9/00805* (2013.01); *B60Q 2300/47* (2013.01); *G05D 2201/0213* (2013.01)

(58) Field of Classification Search
CPC ...... B60Q 1/14; B60Q 1/0023; B60Q 1/1423; B60Q 2300/47; G01S 7/4815; G01S 17/48; G01S 17/89; G01S 17/936; G06K 9/00805; G05D 2201/0213
See application file for complete search history.

(56) References Cited

U.S. PATENT DOCUMENTS

2013/0343071 A1* 12/2013 Nagaoka ................ B60Q 9/008
362/466

FOREIGN PATENT DOCUMENTS

| DE | 102012009908 A1 | 1/2013 |
|---|---|---|
| DE | 102012024627 A1 | 6/2014 |

* cited by examiner

*Primary Examiner* — Huy T Nguyen
(74) *Attorney, Agent, or Firm* — Leydig, Voit & Mayer, Ltd.

(57) ABSTRACT

A method for capturing objects in the environment of a vehicle includes generating a first light pattern in the environment of the vehicle using a light-emitting apparatus of the vehicle; generating a second light pattern in the environment of the vehicle using an alter light-emitting apparatus of an alter vehicle; transmitting generation parameters of the second light pattern from the alter vehicle to the vehicle; optically capturing the first light pattern and the second light pattern using a capturing module of the vehicle; and generating a depth image of at least part of the environment of the vehicle on the basis of the captured light patterns and the transmitted generation parameters.

10 Claims, 3 Drawing Sheets

METHOD FOR CAPTURING OBJECTS IN THE ENVIRONMENT OF A VEHICLE

CROSS REFERENCE TO RELATED APPLICATIONS

This application claims benefit to German Patent Application No. DE 10 2016 115 705.8, filed Aug. 24, 2016, which is hereby incorporated by reference herein.

FIELD

The present invention relates to a method for capturing objects in the environment of a vehicle and to a capturing system for capturing such objects in the environment of a vehicle.

BACKGROUND

It is known in principle that objects in the environment of an object must be captured. The data relating to such captured objects can be made available to security settings or autonomous or partially autonomous driving computers. A wide variety of possibilities are known herefor for capturing the objects in the environment of the vehicle. In addition to sensor systems by way of radar technology or ultrasound, optical methods are also known in principle. Already used, for example, have been light patterns that can be generated e.g. by headlights of a vehicle so that the reflection of the generated light field can be detected in this manner using a camera system. Conclusions can be drawn with respect to these objects or with respect to this environment based on detected diffraction lines of the light pattern at corresponding objects in the environment. As a result, what is known as a depth image can be generated as a three-dimensional image of the environment and be made available to further control mechanisms of the vehicle.

Disadvantages of known methods are in particular the limitations with respect to the selection possibilities of the light pattern of the vehicle. For example, the light-emitting apparatuses of the vehicle are typically mounted fixedly or substantially fixedly on the vehicle. Even if minor adjustment possibilities are provided, it is a substantially fixed generated light cone that will form a first light pattern. Regions next to this light pattern, in particular in the near region of the area in front of the vehicle are here not illuminated or illuminated only poorly. The corresponding acute-angled illumination in the region of the area in front of the vehicle that is a little further away also results in relatively large errors in the evaluation of the reflection of this light pattern.

SUMMARY

In an embodiment, the present invention provides a method for capturing objects in the environment of a vehicle. The method includes generating a first light pattern in the environment of the vehicle using a light-emitting apparatus of the vehicle; generating a second light pattern in the environment of the vehicle using an alter light-emitting apparatus of an alter vehicle; transmitting generation parameters of the second light pattern from the alter vehicle to the vehicle; optically capturing the first light pattern and the second light pattern using a capturing module of the vehicle; and generating a depth image of at least part of the environment of the vehicle on the basis of the captured light patterns and the transmitted generation parameters.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
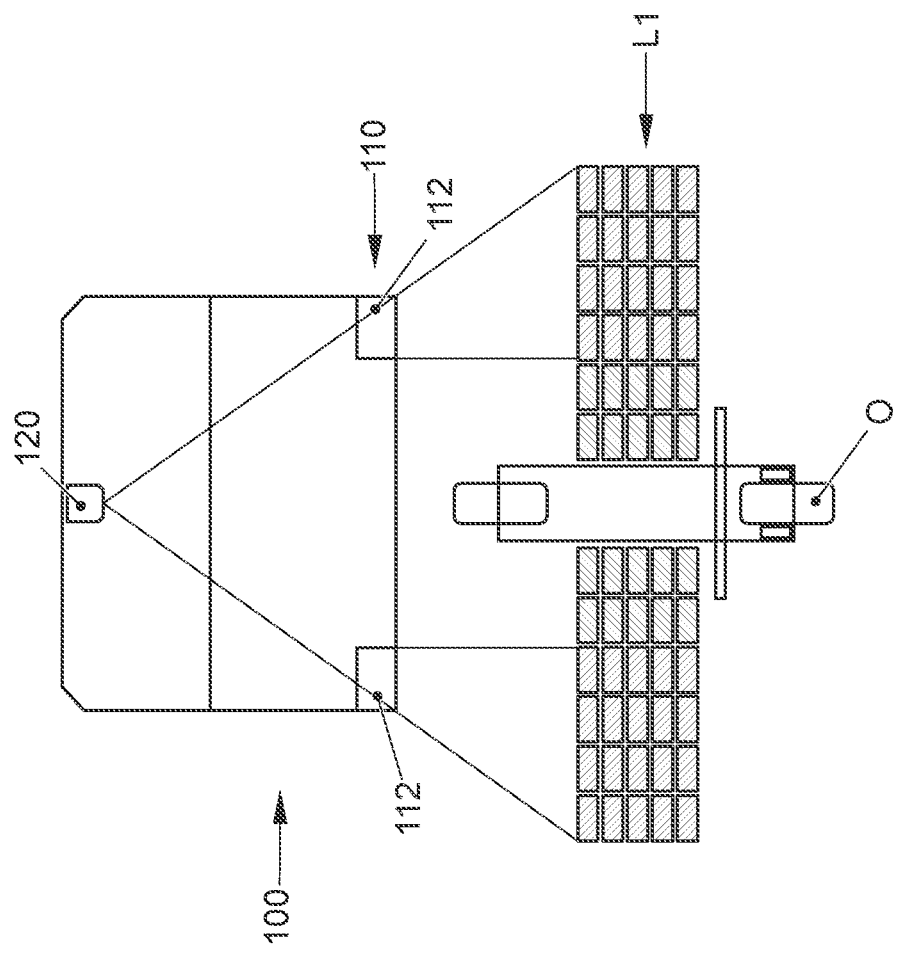
FIG. 1 shows an embodiment of a known solution of a capturing system.

Embodiments of the present invention described herein can at least partially eliminate the previously mentioned disadvantages. In particular, embodiments of the present invention described herein can at least partially cost-effectively and simply allow better capturing of objects in the environment of the vehicle.

A method according to an embodiment of the invention serves for capturing objects in the environment of a vehicle. To this end, the method includes the following steps: generating a first light pattern in the environment of the vehicle using a light-emitting apparatus of the vehicle, generating a second light pattern in the environment of the vehicle using an alter light-emitting apparatus of an alter vehicle, transmitting generation parameters of the second light pattern from the alter vehicle to the vehicle, optically capturing the first light pattern and the second light pattern using a capturing module of the vehicle, and generating a depth image of at least one part of the environment of the vehicle on the basis of the captured light patterns and the transmitted generation parameters.

A method according to an embodiment of the invention is based on a method in which a corresponding depth image is generated from a generated first light pattern in the environment of the vehicle. However, according to the embodiment of the invention, at least one second light pattern of an alter vehicle can be taken into consideration in addition to the first light pattern. It is taken into consideration both in the form of communicated data, specifically the generation parameters, and in optical form by way of detecting this second light pattern. An explanation as to how a method according to the invention can be used in traffic will follow.

If a vehicle is on a road and wishes to perform a method according to the invention for capturing objects in the environment, the headlights of the light-emitting apparatus of this vehicle are switched on. A corresponding region of the environment, typically the area in front of the vehicle, is illuminated by this light-emitting apparatus, and the corresponding light cone represents the first light pattern. This can be a simple light cone or a more complex light pattern, in which for example grid lines can be optically included in the light cone.

As soon as another vehicle, which is also known as an alter vehicle, is located in the environment of the vehicle, this alter vehicle can also contribute data for a method according to the invention. For this purpose, the alter vehicle is likewise equipped with an alter light-emitting apparatus which can be, for example, in the form of the headlights of this alter vehicle. The headlights of the alter vehicle also form a light cone and thus a second light pattern in the area in front of this alter vehicle. Depending on the correlation between the two vehicles, i.e. of the vehicle and of the alter vehicle relative to one another, overlapping or adjoining of the first light pattern and of the second light pattern can thus occur. It is now possible to capture within the vehicle not only the first, ego light pattern, but also the second, alter light pattern of the alter vehicle using a capturing module. In other words, the illumination situation in front of the vehicle is changed since a correlation between a first light pattern and a second light pattern exists.

While in known methods, which are performed only internally to the vehicle, no reasonable evaluation of this correlation of these two light patterns could be performed in such a situation, this can still be performed in the manner according to embodiments of the invention, and additionally also with an improved product in terms of depth imaging. However, in order to be able to perform this, additional data is necessary. The vehicle receives this additional data from the alter vehicle in the form of generation parameters of the second light pattern. Generation parameters within the meaning of the present invention are understood to mean parameters that exert a technical influence on the respective light pattern. As will be explained below, this can be e.g. the type of the light pattern, a grid distribution, the light-emission direction of the alter light-emitting apparatus, the light intensity of the alter light-emitting apparatus or the position of the alter light-emitting apparatus. The generation parameters can of course also include a plurality of different individual parameters. Due to the fact that the ego light-emitting apparatus of the vehicle is known to the vehicle, and correspondingly calibration data herefor are present in an associated control module, the ego generation of the first light pattern can be performed internally to the vehicle, and the corresponding data are available also for the evaluation during the capturing of the first light pattern. Due to the fact that the corresponding data are now also transmitted to the vehicle from the alter vehicle for the second light pattern in the form of generation parameters, the information of the second light pattern can be taken into consideration during the optical capturing of the two light patterns within the ego vehicle. Not only is it thus possible to perform, in principle, in the case of overlapping and complex light situations of two or even more light patterns, the method for capturing objects in the environment, but rather the capturing result in such a situation is even further improved with respect to its quality of its depth imaging. In particular, what is known as a triangulation method can be performed in this way in order to correlate the individual light patterns and the associated reflections with the generation parameters and to make available correspondingly more accurate object data in the environment of the vehicle for the capturing of the respective objects and for the generating depth imaging.

Depth image within the meaning of the present invention can be understood to mean a technical depth description of the environment of the vehicle in at least partial sections. It can be e.g. a three-dimensional map which is made available as a depth image. However, technically readable data that pass on three-dimensional positions or three-dimensional surface extents of the respective object to the vehicle and its control modules are also in principle to be understood to be depth images. Although actual formation of a three-dimensional map which is detectable visually by a human being is possible within the meaning of depth image, it is not absolutely necessary.

It may be advantageous if, in a method according to an embodiment of the invention, the generation parameters have at least one of the following parameter contents: position of the alter light-emitting apparatus, light-emission direction of the alter light-emitting apparatus, light intensity of the alter light-emitting apparatus, and type of the second light pattern.

The previous list is not an exhaustive list. The individual pieces of information here can, in combination with one another, form a multiplicity of generation parameters or only a single one of these generation parameters can be transmitted as such. The position of the alter light-emitting apparatus relates in particular here to its relative position within or with respect to the alter vehicle.

The light-emission direction is also preferably determined relative to the driving direction of the alter vehicle or output as generation parameter. The light intensity of the alter light-emitting apparatus can be passed on e.g. in lux or in lumen as corresponding technical data information. The type of the light pattern is understood to mean in particular the actual manifestation of the light cone. In addition to the circumferential geometry of the light cone, more complex geometries, e.g. grid lines or grid crosses can be included, which are part of the type of the second light pattern.

It can furthermore be advantageous if, in a method according to an embodiment of the invention, the light-emitting apparatus of the vehicle and/or the alter light-emitting apparatus of the alter vehicle have in each case two front headlights. Vehicles are typically always equipped with front headlights. For a method according to the invention, especially objects which are located in front of the vehicle, i.e. are located in the area in front of the environment of the vehicle, are also of interest. The use of in each case two front headlights for the respective light-emitting apparatus or alter light-emitting apparatus has the result that already existing technical devices of the vehicle can be used to perform the method according to the invention. Additional components are thus not necessary, with the result that a method according to the invention is able to be realized technically simply and cost-effectively. The two front headlights of each light-emitting apparatus here preferably form their own light cones, with the result that the combination of the light cones of the respectively two front headlights forms the associated light pattern of the light-emitting apparatus or of the alter light-emitting apparatus.

It is likewise advantageous if, in a method according to an embodiment of the invention, the first light pattern and the second light pattern have a similar, in particular an identical or substantially identical configuration. A configuration of the light pattern here is understood to mean the respective geometry, the type and/or the light intensity of the respective light pattern. Individual light patterns can, for example, have light grids, with the result that individual grid lines can allow for improved evaluation for the depth imaging. As soon as the light patterns are similar to one another, the corresponding grid lines have similar spacings or similar base geometries. Preferably it is even possible to use identical or substantially identical light patterns, with the result that simplified evaluation can be carried out in the end.

It may be advantageous if, in a method according to an embodiment of the invention, the second light pattern at least partially overlaps with the first light pattern. Depending on how the vehicles are arranged with respect to one another and how the light-emission directions of the two light-emitting apparatuses are aligned, overlapping of the light patterns can occur. In reality this means that individual light cones overlap one another such that regions having increased brightness are provided in this overlap section. Overlapping also has the result that additionally, an optical conclusion with respect to the correlation of the two light patterns becomes possible. For example, if individual light grid lines are indicated or included in the respective light pattern, it is possible by way of the angled orientation and the evaluation of this angled orientation between these individual light grid lines to evaluate an optical correlation with respect to the relative geometry between the vehicle and the alter vehicle. It is also possible due to brightness changes to identify such a double region, even if no light grids for the respective light patterns are used.

It is furthermore advantageous if, in a method according to an embodiment of the invention, the second light pattern is generated in regions of the environment which adjoin the first light pattern in section-wise fashion. As has already been explained, the light-emitting apparatuses are formed in particular by the respective front headlights of the vehicle. This has the result that in the near region in front of the vehicle, poor illumination or in partial regions even no illumination exists anymore. However, in order to still be able to perform a method according to the invention for capturing objects in the regions without illumination, the second light pattern is preferably made available or arranged in particular in regions that adjoin the first light pattern. The second light pattern thus no longer serves only in an overlapping manner, but also in an expanding fashion for additional illumination of otherwise not illuminated regions of the environment. The advantages of a method according to the invention are thus able to be attained for a larger part of the environment with the same results.

It can be of further advantage if, in a method according to an embodiment of the invention, preferred generation parameters are transmitted to the alter vehicle, in particular by the vehicle. For example, it is advantageous if, even at the beginning of the method, communication between the vehicle and the alter vehicle takes place that deals with the planned performance of the method according to the invention. For example, the vehicle can communicate to the alter vehicle which generation parameters are optimum for the current situation or for the capturing possibilities of the vehicle. Here, specific capturing parameters or parameter ranges for the generation parameters can be transmitted as preferred generation parameters. It is also conceivable that the alter vehicle transmits in advance corresponding generation parameter ranges, which are possible in principle for the alter vehicle from a technical standpoint, to the vehicle. This advance communication between the vehicle and the alter vehicle leads to a facilitated performance of the method according to the invention, since the technical cooperation with respect to these generation parameters can already be taken care of in advance.

It is a further advantage if, in a method according to an embodiment of the invention, at least one further, second light pattern is generated with an alter light-emitting apparatus of at least one further alter vehicle and is taken into consideration for the further method steps. For example, it is also possible for two, three or more alter vehicles to be used, correspondingly also with two, three or more light patterns. The greater the number of light patterns that are available, the greater is the complexity in terms of the evaluation of the correlation of all light patterns, but also the more accurately the desired depth imaging for the capturing of the objects in the environment can be performed in the end using different methods, e.g. by triangulation. In particular in situations of high traffic, in congestion situations or in stop-and-go traffic, it is possible in this manner to make available a considerably improved detection and capturing of objects in the environment for the respective vehicle.

It can furthermore be advantageous if, in a method according to an embodiment of the invention, the step of optically capturing is performed in a capturing module of the vehicle and/or in an alter capturing module of the alter vehicle. In addition to the general possibility that the step of optically capturing takes place exclusively in the vehicle using a capturing module that is arranged there, it is also possible for the alter capturing module to be used. The alter capturing module can, of course, be used alternatively or additionally. The additional use of the alter capturing module permits the provision of a stereo camera situation, as it were, by way of the two vehicles together. Here, the captured data are likewise transmitted to the vehicle by the alter capturing module of the alter vehicle in the form of image data for evaluation and here preferably to an associated control module. It is thus possible to use a combination of technical features of the present vehicles, i.e. of the vehicle and of the at least one alter vehicle, not only for generating the light patterns, but also for capturing the light situation of all light patterns.

According to an embodiment of the present invention, a capturing system for capturing objects in the environment of a vehicle is described. Such a capturing system has a generation module for generating a first light pattern in the environment of the vehicle using a light-emitting apparatus of the vehicle. Furthermore present is a communication module for receiving generation parameters of a second light pattern from an alter vehicle. It is possible using a capturing module to perform optical capturing of the first light pattern and of the second light pattern. A control module additionally serves for generating a depth image at least of a part of the environment of the vehicle on the basis of the captured light patterns and of the transmitted generation parameters.

A capturing system according to an embodiment of the invention thus affords the same advantages as were explained in detail with respect to a method according to the invention. The capturing system is in particular configured to perform a method according to the invention.

FIG. 1 schematically shows the problem situation according to known solutions. Arranged in a vehicle 100 is a light-emitting apparatus 110 having two front headlights 112. The front headlights 112 make available a first light field L1, which is equipped with corresponding light cones. The light pattern L1, however, does not capture an object O, or only partially captures an object O, which is here illustrated as a motorcycle. If a capturing module 120, for example a depth camera or another optical detection means, is now used to optically recapture the light field L1, the reflection can be made available during the evaluation only in those regions which have actually been irradiated by a light pattern L1. Since the region of the object has not been irradiated by the light pattern L1, or only partially, it is not possible here to make any statement, and no evaluation for the generation of an associated depth image can be provided. In other words, the vehicle 100 or the capturing module 120 in this region of the object O is blind, as it were, due to a lack of the first light distribution L1.

Figure 2:
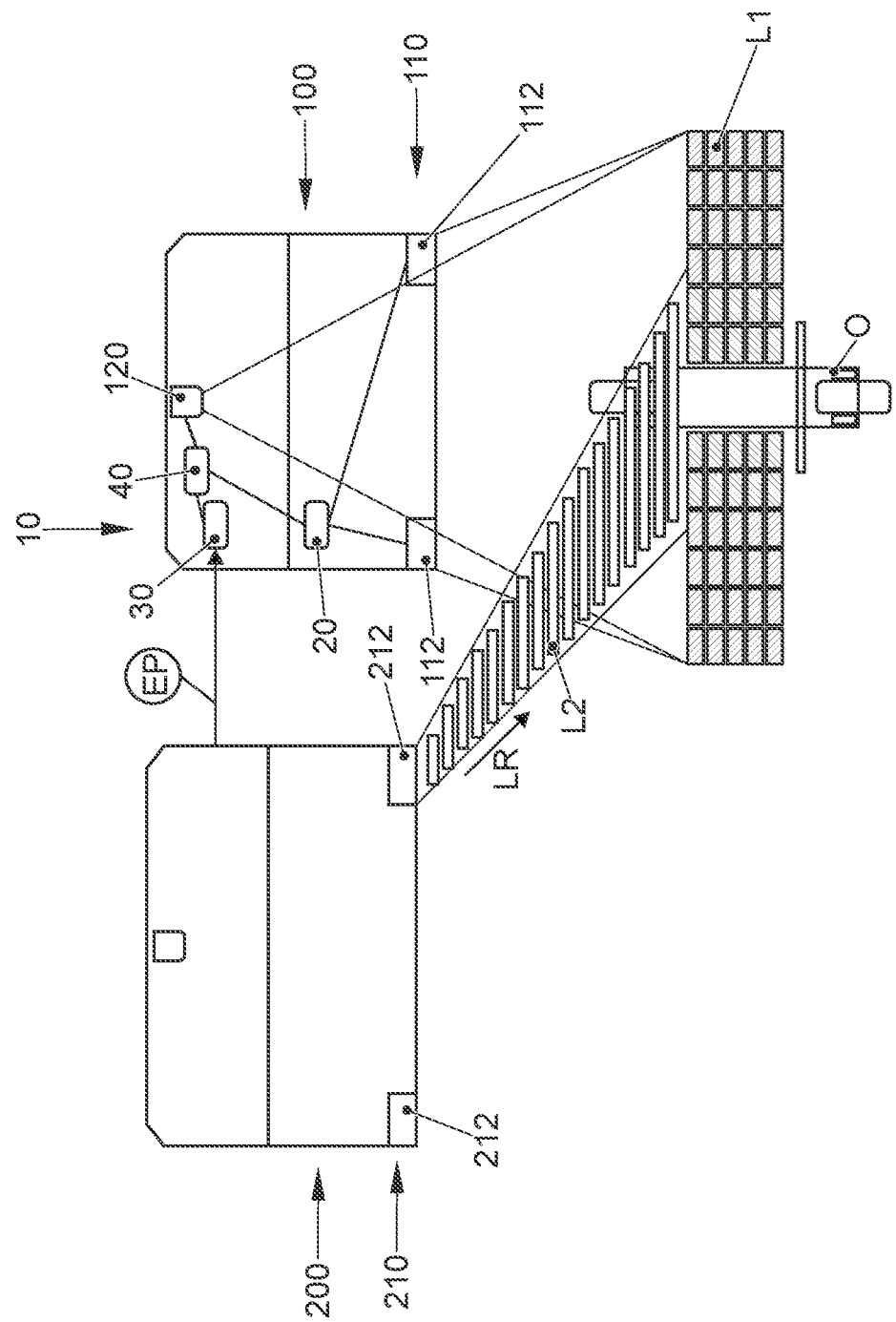
FIG. 2 shows a method according to an embodiment of the invention.

In order to now be able to capture this region likewise in an optical manner and to make it available for depth imaging, FIG. 2 shows a solution which provides a correlation with a second light pattern L2. An alter vehicle 200 in this case drives next to the ego vehicle 100. The alter vehicle 200 is likewise equipped with a light-emitting apparatus 210 having front headlights 212. The front headlights 212, in this case the front headlight 212 on the right, now generate a light pattern L2 having a light-emission direction LR in the direction of the area in front of the vehicle 100 which has not been illuminated. In other words, what is shown here is that the region of the object O is now illuminated by the second light pattern L2. Arranged in the vehicle 100 is a capturing system 10. It is possible with the aid of a capturing module 120, in this case e.g. again a depth camera, to detect the light situation in front of the vehicle 100. Due to the second light pattern L2, the light situation now also includes reflections by the object O. The corresponding image is transmitted to the control module 40. The first light pattern L1 has already been generated by the light-emitting apparatus 110 using a generation module 20. Transmission of generation parameters EP is now additionally performed from the alter vehicle 200 to a communication module 30 of the capturing system 10 of the vehicle 100. These generation parameters EP include in particular calibration data of the vehicle 200 that deal with the correlation of the second light pattern L2 with respect to the geometric arrangement, alignment and position of the alter vehicle 200. By evaluating these generation parameters EP, it now becomes possible to evaluate the reflections of the second light pattern L2 and the corresponding capturing in the capturing module 110 of the vehicle 100 and to process them in a native image.

Figure 3:
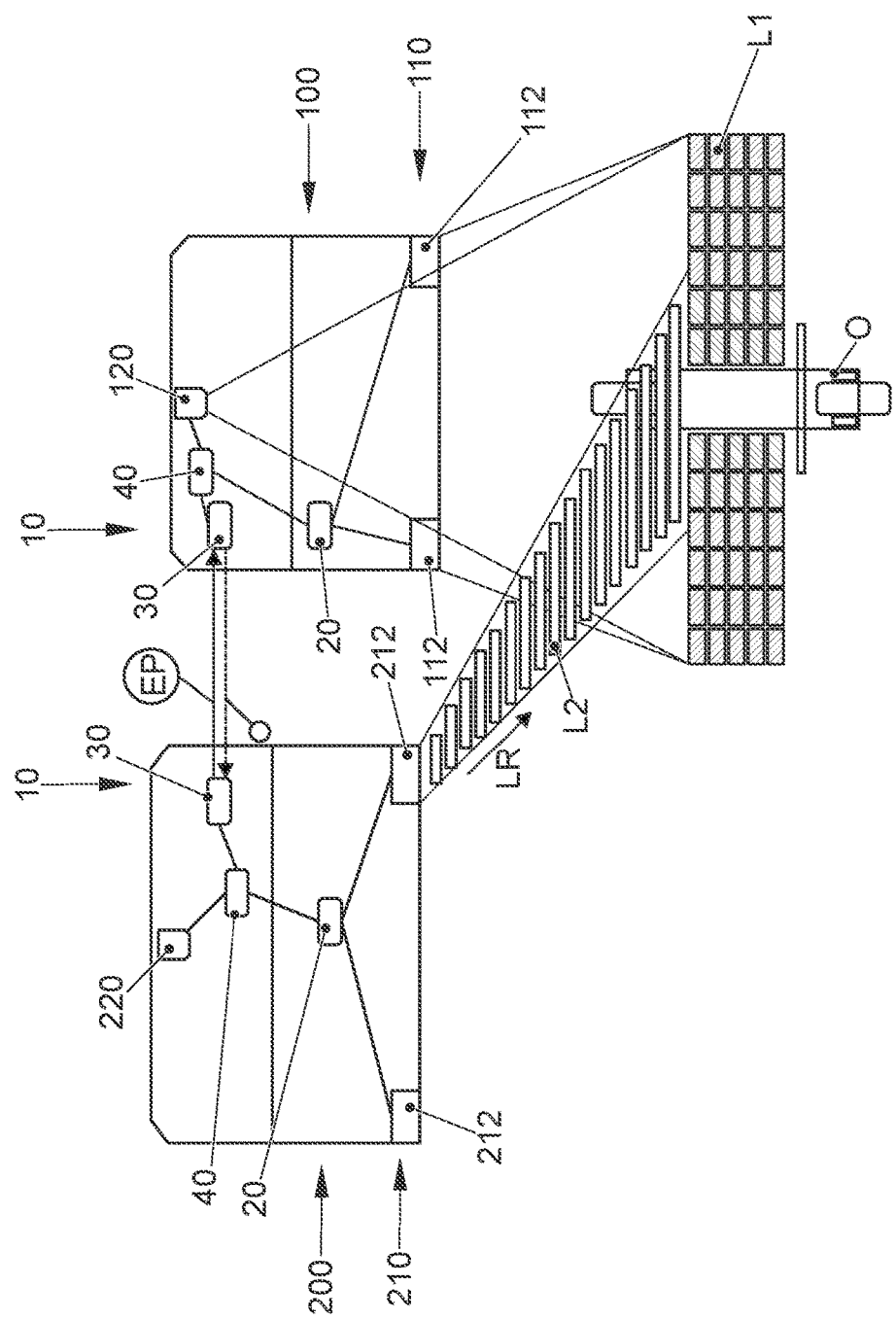
FIG. 3 shows a method according to a further embodiment of the invention.

FIG. 3 shows how a system according to the invention can additionally operate, in particular, if the alter vehicle is also equipped with a capturing system 10. Even before the method is performed, advance communication can take place which is illustrated by way of the dashed arrow line between the two communication modules 30 of the vehicle 100 and of the alter vehicle 200. For example, possible setting ranges for generation parameters EP of the alter light-emitting apparatus 210 can be decided on in advance. In addition, ranges for the generation parameters EP that are preferred by the vehicle 100 can be communicated to the alter vehicle 200 in advance. It is thus possible to further improve the communication and especially the later evaluation of the method steps according to the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for capturing objects in the environment of a vehicle, the method comprising:
   generating a first light pattern in the environment of the vehicle using a light-emitting apparatus of the vehicle;
   generating a second light pattern in the environment of the vehicle using an alter light-emitting apparatus of an alter vehicle,
   transmitting generation parameters of the second light pattern from the alter vehicle to the vehicle,
   optically capturing the first light pattern and the second light pattern using a capturing module of the vehicle, and
   generating a depth image of at least part of the environment of the vehicle on the basis of the captured light patterns and the transmitted generation parameters.

2. The method as claimed in claim 1, wherein the generation parameters contain at least one of the following:
   position of the alter light-emitting apparatus,
   light-emission direction of the alter light-emitting apparatus,
   light intensity of the alter light-emitting apparatus, and
   type of the second light pattern.

3. The method as claimed in claim 1, wherein the light-emitting apparatus of the vehicle and the alter light-emitting apparatus of the alter vehicle have in each case two front headlights.

4. The method as claimed in claim 1, wherein the first light pattern and the second light pattern have a same configuration.

5. The method as claimed in claim 1, wherein the second light pattern at least partially overlaps with the first light pattern.

6. The method as claimed in claim 1, wherein the second light pattern is generated in regions of the environment which adjoin the first light pattern at least in section-wise fashion.

7. The method as claimed in claim 1, wherein preferred generation parameters are transmitted to the alter vehicle from the vehicle.

8. The method as claimed in claim 1, wherein at least one further, second light pattern is generated by at least one further alter vehicle using an alter light-emitting apparatus and taken into consideration for further method steps.

9. The method as claimed in claim 1, wherein the step of optically capturing is performed in a capturing module of the vehicle and/or in an alter capturing module of the alter vehicle.

10. A capturing system for capturing objects in the environment of a vehicle, the capturing system comprising:
    a generation module for generating a first light pattern in the environment of the vehicle using a light-emitting apparatus of the vehicle,
    a communication module for receiving generation parameters of a second light pattern from an alter vehicle,
    a capturing module for optically capturing the first light pattern and the second light pattern, and
    a control module for generating a depth image of at least part of the environment of the vehicle on the basis of the captured light patterns and the transmitted generation parameters.

* * * * *